United States Patent [19]

Cundall

[11] Patent Number: 4,606,176
[45] Date of Patent: Aug. 19, 1986

[54] BALE-SHEATHING DEVICE

[76] Inventor: David J. Cundall, Stone Lodge Farm, Medge Hall, Thorne, Doncaster, S. Yorkshire, United Kingdom, DN8 4SW

[21] Appl. No.: 592,951

[22] Filed: Mar. 23, 1984

[30] Foreign Application Priority Data

| Mar. 26, 1983 [GB] | United Kingdom | 8308367 |
| Jun. 23, 1983 [GB] | United Kingdom | 8317030 |
| Jul. 27, 1983 [GB] | United Kingdom | 8320176 |
| Dec. 16, 1983 [GB] | United Kingdom | 8333571 |

[51] Int. Cl.$^4$ .................................... B65B 43/42
[52] U.S. Cl. .................................. 53/567; 53/469; 53/576
[58] Field of Search ............... 53/567, 576, 513, 255, 53/459, 260, 258, 469, 575, 570; 141/10, 114, 313, 390; 414/24.5, 111, 724, 607, 608; 198/861

[56] References Cited

U.S. PATENT DOCUMENTS

| 3,290,841 | 12/1966 | Sartore | 141/390 |
| 3,983,914 | 10/1976 | Benson | 53/384 |
| 4,248,561 | 2/1981 | Graves | 414/24.5 |
| 4,300,327 | 11/1981 | Bridger | 53/255 |
| 4,337,805 | 7/1982 | Johnson et al. | 141/114 |
| 4,396,330 | 8/1983 | Rozeboom | 414/24.5 |

FOREIGN PATENT DOCUMENTS 2151116  8/1978  Fed. Rep. of Germany ...... 141/114

Primary Examiner—John Sipos
Assistant Examiner—Donald R. Studebaker

[57] ABSTRACT

A bale-sheathing device is provided for placing a tubular plastics sheath around bales of straw, grass, hay or silage, in order to facilitate chemical treatment of the latter. The bale-sheathing device includes a mobile sheath-carrying structure for supporting and holding open an axially closed-up portion of the sheath in a manner enabling this closed-up portion to be progressively pulled out rearwardly off the sheath-carrying structure. The sheath-carrying structure is forwardly provided with means, such as a pair of inclined guides, for lifting up a bale to be sheathed and guiding it through the closed-up portion of the sheath as the device is advanced. The bale-sheathng device enables a sheath to be passed around each successive bale of a row of juxtaposed bales without having to drag the bale over the sheath or the sheath under the bales.

7 Claims, 6 Drawing Figures

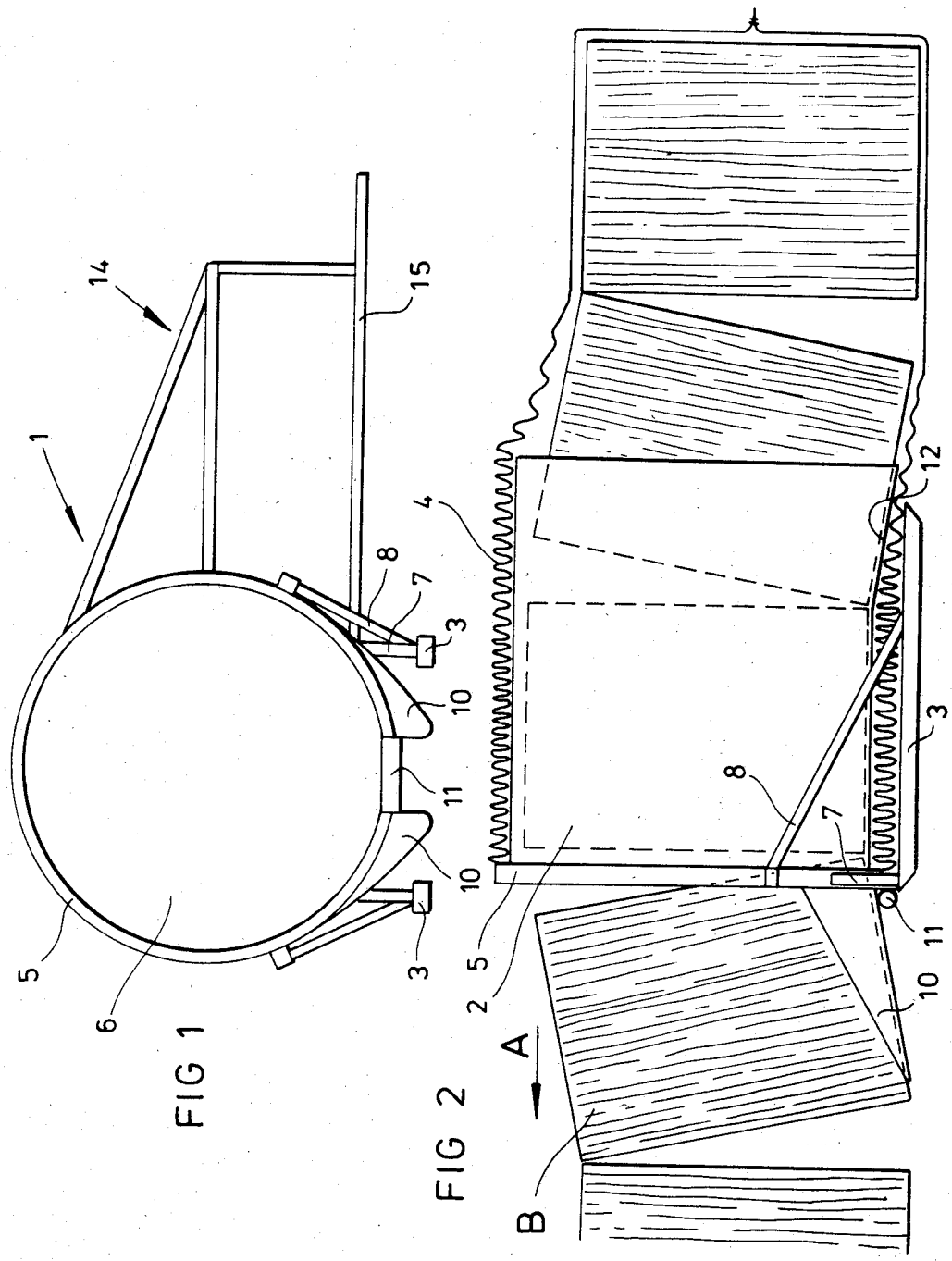

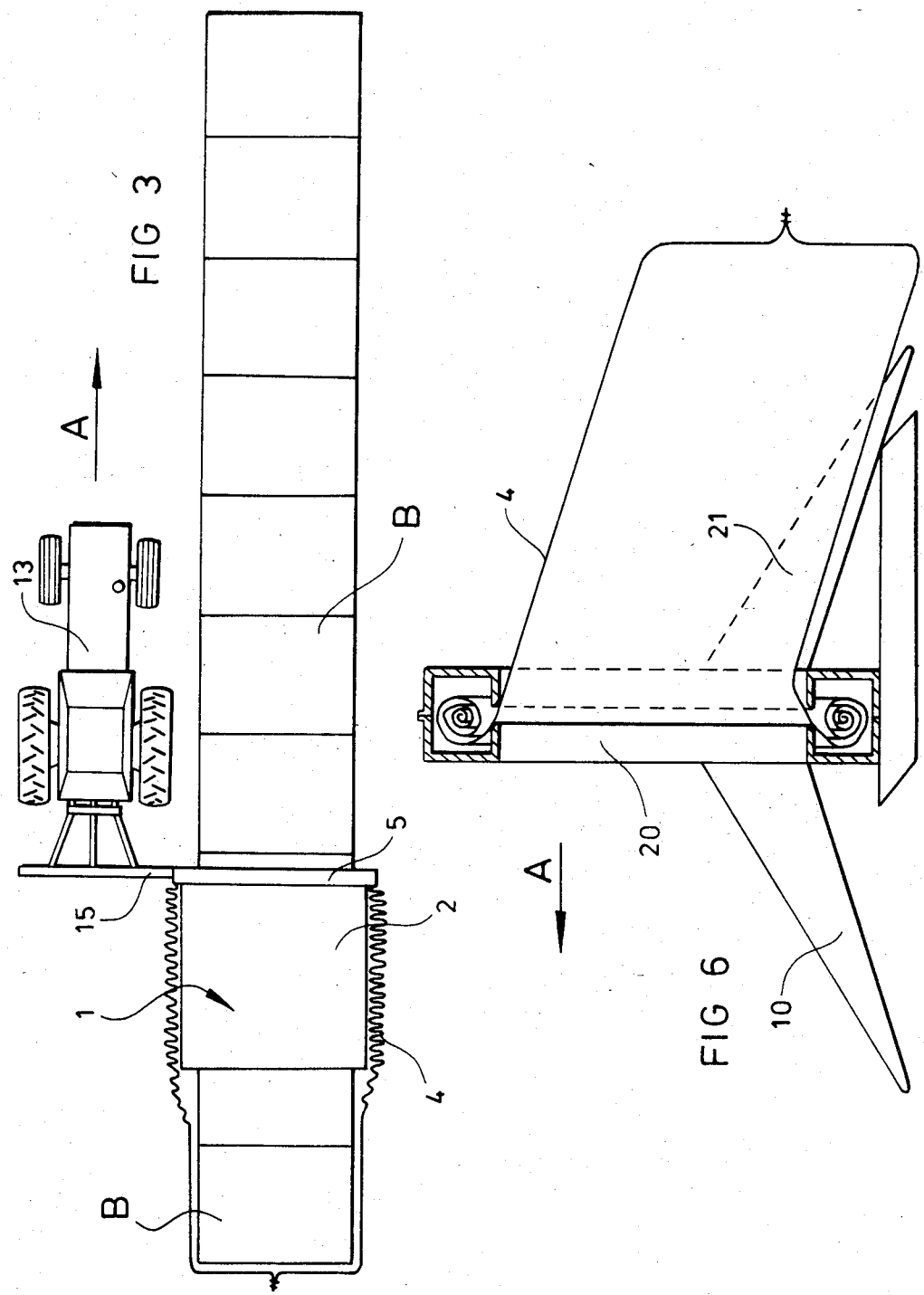

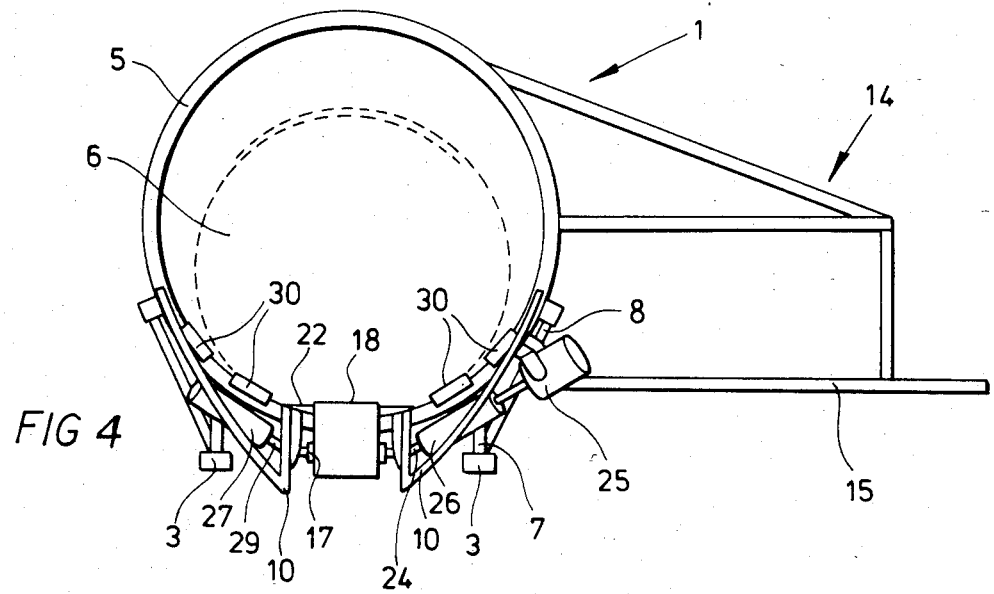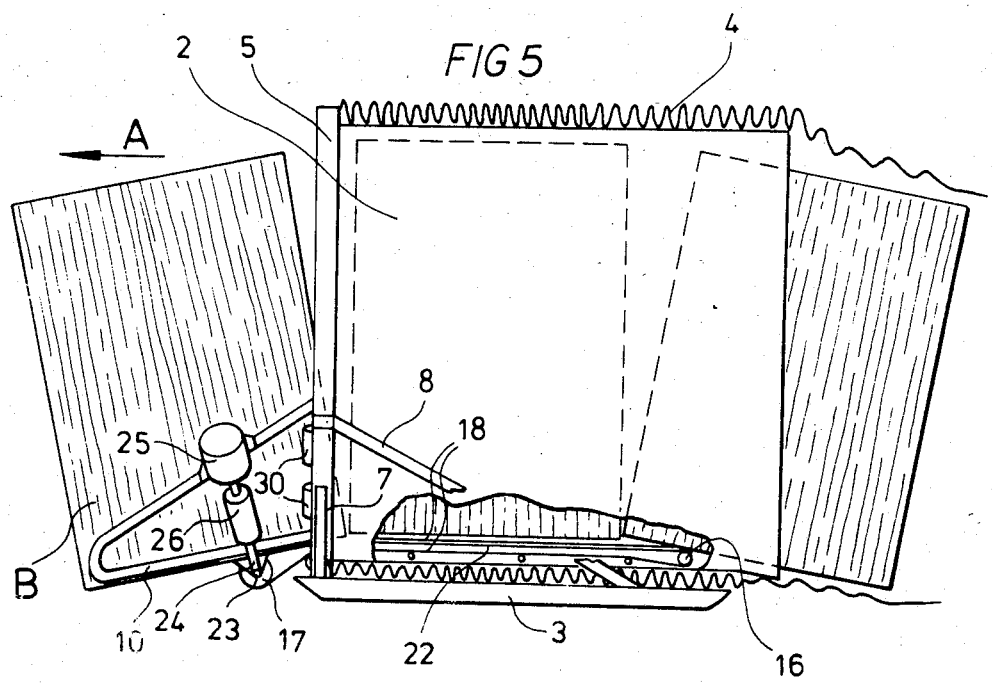

BALE-SHEATHING DEVICE

FIELD OF THE INVENTION

The present invention relates to a bale-sheathing device for placing a tubular sheath around bales for example, of straw, grass, hay or silage.

BACKGROUND OF THE INVENTION In recent years there has been an increasing use of processes for chemically treating agricultural products, such as straw and hay, to improve their quality as animal feed stuffs.

Such treatment processes are normally carried out within an enclosure and may take several weeks to complete. In order to minimise the cost of providing containment for large volumes of material undergoing treatment, there has been an increasing use of plastic sheets and tubular sheaths for this purpose. Thus, for example, tubular plastics sheaths of 2 m diameter and up to 80 m in length are available for providing containment for large round bales of up to 1.8 m in diameter.

One problem with the use of tubular sheaths is the difficulty in inserting bales to be treated into a sheath without damaging the latter and thereby adversely prejudicing the integrity of the containment provided by the sheath. In this respect, dragging a bale into a sheath or the sheath under a bale is highly undesirable.

It is an object of the invention to provide a device facilitating the enclosure of bales in tubular sheaths.

SUMMARY OF THE INVENTION

According to one aspect of the present invention, there is provided a bale-sheathing device comprising a mobile sheath-carrying structure arranged to support and hold open an axially closed-up portion of a tubular sheath in a manner enabling said closed-up portion to be progressively pulled out rearwardly off the sheath-carrying structure, and bale lifting and guide means carried by the mobile sheath-carrying structure and arranged to lift up a bale to be sheathed and guide it through the closed-up portion of the sheath as the device is advanced relative to the bale, the device being so arranged that after passage through the closed-up portion of the sheath, the bale is put down again whereby, in use of the device, the bale comes to rest within an axially opened-out part of the sheath pulled out off the structure during advance of the device.

The bale-sheathing device of the invention thus enables an axially closed-up sheath portion to be passed around each successive bale of a row of bales with the sheath being pulled out off the device to cover the bales past which the device has already advanced. In this manner, a row of bales can be readily sheathed without having to drag the bales over the sheath or the sheath under the bales, either operation being highly undesirable from the point of view of risk of damage to the sheath.

Normally, one end of the tubular sheath will be sealed before the first bale of a row of bales to be sheathed is lifted up, passed through the closed-up sheath portion and put back down again. Once a bale has been sheathed, it is not further disturbed and acts as an anchor facilitating the pulling off of the sheath from the bale-sheathing device as it continues its advance along the row of bales.

In one embodiment of the invention, the sheath-carrying structure is in the form of a short, large-diameter, tunnel structure carrying the closed-up portion of the sheath concertinered around its outer surface. In this embodiment, the bale lifting and guide means is arranged to guide each bale to be sheathed through the inside of the tunnel structure so that the bale passes through the closed-up portion of the sheath without contact with the latter The cross-sectional form of the sheath and tunnel structure are preferably the same as that of the bales (for example, circular) though in practice it is envisaged that a circular structure will, for economic reasons, be generally employed for all shapes of bale, Furthermore, the walls of the tunnel structure can be either continuous (for example, of sheet material) or of an open framework construction In another embodiment, the bale-sheathing device of the invention carries the closed-up portion of the sheath in a rolled up, inside-out, condition, the sheath being arranged to unwind rearwardly as a bale is passed through the middle of the roll.

The lifting and guide means preferably comprise a pair of blades (either solid or skeletal in form) which project forwardly and downwardly from the sheath-carrying structure to engage beneath a bale as the bale-sheathing device is advanced. These blades serve to lift each bale to be sheathed up into the closed-up portion of the sheath carried by the structure. In the embodiment described above in which the sheath is carried corrugated around the outside of a tunnel structure, the walls of this structure ensure the proper guiding of bales through the closed-up portion of the sheath and therefore form part of the lifting and guiding means as well as the sheath-carrying structure.

To facilitate the passage of a bale through the sheath-carrying structure, the latter can be provided with a powered conveyor; this is particularly useful for sheathing a bale by itself or the last bale in a row since there is no subsequent bale to act as an abutment keeping the bale being sheathed stationary while the device is advanced therepast Whereas it would be possible to make the bale-sheathing device a self-propelled piece of equipment, for reasons of economy it is considered preferable to provide the device with an offset towing rig to enable the device to be towed to one side and to the rear of a traction unit such as an agricultural tractor. In any event, the sheath-carrying structure of the device can be fitted either with wheels or skids to facilitate its advance and ensure that the closed-up sheath portion is not dragged along the ground but remains supported by the sheath-carrying structure.

According to another aspect of the present invention, there is provided a bale-sheathing device comprising
 a mobile tunnel structure arranged to support around its outside an axially closed-up portion of a tubular sheath in a manner enabling access into the interior of the closed-up sheath portion through a front end of the tunnel structure while permitting the closed-up sheath portion to be progressively pulled out off the rear end of the tunnel structure; and
 inclined guides extending forwardly and downwardly from the front end of the tunnel structure and operative upon advance of the device along a row of juxtaposed bales to engage beneath each bale in turn and guide it upwards through the front end of the tunnel structure and into the interior of the latter; the rear end of the tunnel structure being open whereby to permit each bale guided into the tunnel structure to exit out of the rear end and come to rest within an axially opened-out part of the sheath pulled out off the tunnel structure during advance of the device.

The bale-sheathing device of the invention can be used to sheath bales of straw, hay or silage both of the cylindrical and rectangular type. Furthermore, the device can also be used to sheath non-baled bulk agricultural materials and products provided the lifting and guide means are suitable formed to carry out their functions.

BRIEF DESCRIPTION OF THE DRAWINGS

Various other novel aspects and features of the invention will become apparent from the following description, given by way of example, of a bale-sheathing device, reference being made to the accompanying diagrammatic drawings, in which:

FIG. 1 is a front elevation of a first embodiment of the bale-sheathing device;

FIG. 2 is a side elevation of the FIG. 1 device being used to enclose large round bales in a tubular sheath (shown in outline only), a towing rig of the device being omitted for clarity;

FIG. 3 is a plan view showing, on a reduced scale, the FIG. 1 device in the same state of use as illustrated in FIG. 2, the device being shown towed by a tractor;

FIG. 4 is a front elevation similar to FIG. 1 but showing a variant of the FIG. 1 device;

FIG. 5 is a side elevation similar to FIG. 2 but showing the FIG. 4 variant, part of the tunnel structure being shown cut away to illustrate the disposition of a powered conveyer of the device; and FIG. 6 is a vertical longitudinal section through a second embodiment of the bale-sheathing device.

DESCRIPTION OF THE PREFERRED EMBODIMENT

The bale-sheathing device now to be described is particularly suitable for enclosing large round bales of up to 1.8 m in diameter in a tubular plastics sheath of 2 m diameter. The first embodiment of the bale-sheathing device 1, shown in FIGS. 1 to 3, comprises a cylindrical tunnel structure 2 mounted on two skids 3. The tunnel structure 2 is arranged to carry, around its outer cylindrical surface, at least a portion of a tubular plastics sheath 4, this portion being in a corrugated state in which it is axially closed-up on the tunnel structure. The tunnel structure 2 can be formed with a continuous cylindrical surface (for example by the use of sheet material carried on a rigid framework) or may be of open frame-work construction.

One end of the tunnel structure 2 is formed with a strengthened rim 5 defining an entry mouth 6 large enough to allow the passage therethrough of large round bales B up to 1.8 m in diameter. Each skid 3 is rigidly connected to the rim 5 by means of a respective leg 7 and strut 8. The skids 3 are arranged to support the tunnel structure 2 at a height off the ground sufficient to ensure that the gap beneath the bottom of the structure 2 and the ground is large enough not only to enable the sheath to be easily bunched up on the structure 2, but also to prevent the bunched-up sheath dragging unduly on the ground upon advance of the bale-sheathing device 1 on its skids 3. In practice, the gap between the tunnel structure and ground is of the order of 0.18 m (approximately 7 inches).

The bale-sheathing device is provided with means arranged to lift a bale B off the ground and guide it into the mouth 6 of the tunnel structure 2; in the present embodiment, these means comprise a pair of blades 10 which project forwardly and downwardly from the rim 5 (considered relative to the intended direction of advance A of the device). The shape and disposition of the blades 10 is such that upon advance of the device towards a bale B, the blades 10 engage beneath and on respective sides of the bale B, progressively lifting the latter into the mouth 6. A roller 11 carried by the rim 5 at the bottom of the mouth 6 facilitates the transfer of the bale B from the blades 10 into the interior of the tunnel structure 2.

The rear end 12 of the tunnel structure 2 can be given a slight downward slope to facilitate deposition of bales B back onto the ground after passage through the tunnel structure 2. The resulting small increase in tunnel diameter also serves to provide a slight resistance to drawing off of the sheath from the structure 2 and this ensures that the sheath comes off smoothly and not all together.

To enable the bale-sheathing device 1 to be towed by a tractor 13 while leaving the front of the device unobstructed, the device is provided with an offset towing rig 14. This rig 14 includes a transverse bar 15 which is rigidly connected to the rim 5 and, in use, can be coupled to the tractor in a manner ensuring that the bar 15 remains orientated transversely of the tractor centre line. In an alternate arrangement, the bar 15 may extend forwardly as well as transversely (for example, at an angle of 45°).

Operation of the bale-sheathing device will now be described.

In order to sheath a row of large round bales B, the device 1 is first aligned with one end of the row with a tubular sheath 4 bunched up on the outside of the tunnel structure 2. As much as 80 m of sheath can generally be accommodated in this manner. The rear end of the sheath 4 is then sealed over the rear of the tunnel structure 2. Thereafter, the tractor 13 is advanced in the direction of arrow A to move the blades 10 beneath the first bale B, causing the latter to be lifted up through the mouth 6 and into the interior of the tunnel structure 2.

As the tractor 13 continues its advance, the blades 10 engage beneath the second bale B and raise this bale up towards the mouth 6, the first bale B being pushed by the second bale through the tunnel structure. With the subsequent passage of the third bale B up the blades 10, the first bale B is pushed out of the rear of the tunnel structure 2 to be deposited back on the ground in its original position.

In its passage through the interior of the tunnel structure 2, the first bale B also moves through the interior of the bunched up sheath 4 (it will, of course, be appreciated that the movements here referred to are relative movements and in practice it is the bunched-up sheath which moves about the bale B rather than vice versa). As the first bale B emerges from the rear of the tunnel structure 2, it engages the sealed-up end of the sheath 4 and causes some of the sheath to be pulled off from around the tunnel structure 2. The sheath 4 drawn off the structure 2 is pulled out to its full axial extent. Upon the first bale being deposited back on the ground, it will therefore reside in the axially opened out end portion of the sheath 4.

This first bale B thereonafter serves as an anchor for the sheath 4 so that as the device 1 moves away from the first bale, a corresponding length of sheath is pulled out off the tunnel structure 2. Of course, as the device 1 continues its advance, the second, third and subsequent bales are, in turn, passed through the tunnel structure 2 (and thus through the bunched-up sheath) and deposited back on the ground in their original positions, the difference being that now these bales B are enclosed in the sheath 4 pulled off the structure 2.

In this manner, all the bales B of the row are sheathed in a single continuous operation With respect to the last bale in a row (or, indeed, an isolated bale), since there is no following bale to "push" this bale right through the tunnel structure, this bale will have to be moved through the structure manually or in some other way.

In order to assist the passage of the bales through the tunnel structure (and, in particular the passage of the last bale), a bed of idle rollers or a powered conveyor (such as a powered roller bed or belt conveyor) can be provided in the bottom of the tunnel structure. Furthermore, the bale sheathing device can be provided with powered input rollers for assisting the passage of the bales up the guide blades 10. FIGS. 4 and 5 show a variant of the FIG. 1 device provided both with powered input rollers and a powered belt conveyor in the tunnel structure.

The powered belt conveyor of the variant of FIGS. 4 and 5 comprises a driven roller 17 mounted between the guide blades 10 (the latter being in the present example, of skeletal form), an endless conveyor belt 18 and a return roller 16. The upper pass of the belt 18 is arranged to move, during the operation of the device, from left to right as viewed in FIG. 5. A floor plate 22 fixed along its side edges to the internal surface of the tunnel structure, serves to separate the upper and lower passes of the belt 18. The roller 17 is coupled via a universal joint 23 and a drive shaft 24 to an hydraulic motor 25 arranged to be powered from the tractor 13.

The shaft 24 carries a side roller 26 arranged to contact the side of a bale B to facilitate its passage up the guide blades 10; a second side roller 27 is symmetrically disposed on the opposite side of the device. The side roller 27 is carried on a shaft 29 that is connected via a universal joint to the driven roller 17. It would, of course, be possible to use side wheels instead of side rollers 26, 27.

Rollers 30 are mounted around the front edge of the tunnel structure to facilitate the entry of a bale B into the structure.

In use of the variant of FIGS. 4 and 5, the powered side rollers 26, 27 and the powered conveyor constituted by the rollers 16, 17 and belt 18, greatly facilitate moving each bale, in turn, into and through the tunnel structure. As an alternative to the rollers 26, 27 and the powered conveyor 16, 17, 18 being driven from the hydraulic motor 25, one or more ground-driven wheels or rollers can be kinematically coupled to the rollers 26, 27 and conveyor 16, 17, 18 to drive the latter as the bale-sheathing device 1 is pulled along by the tractor 13.

The described bale-sheathing device 1 ensures that the sheath 4 does not have to be dragged over the ground or have bales dragged over it, both operations being likely to result in damage and possible tearing of the sheath on sharp stones. Furthermore, since the bales are not moved relative to the ground and, at any one time, only one bale is actually being raised (and then only through a small distance), the power required to operate the device 1 is not large enabling the whole operation to be effected smoothly and speedily.

Various modifications to the described bale-sheathing device are, of course, possible. Thus, for example, the skids 3 can be replaced by wheels and the device can be made self-propelled rather than tractor-drawn.

Furthermore, the diameter of the tunnel structure can be made adjustable to suit different sheath and bale sizes. This adjustment can be achieved, for example, by forming the tunnel structure from two flexible metal sheets each secured to a respective side edge of the plate 22 (see FIGS. 4 and 5) and curving up and around in a semi-circle to overlap each other above the belt 18 (see dashed outline in FIG. 4). The two sheets are releasably secured together in their overlap region in a manner enabling the extent of overlap, and thus the diameter of the tunnel defined by the sheets, to be adjusted; typically, a variation in tunnel diameter of between 4 ft and 6 ft (1.9 m and 2.4 m) may be provided for.

Although the use of the blades 10 (with or without the assistance of powered rollers) provides a simple and convenient way of raising the bales B into the tunnel structure 2, other bale lifting means could be provided. Thus, for example, an hydraulic power lift could be provided which was forwardly extendable from the tunnel structure to pick up the next bale to be sheathed in a position in front of the structure, the structure being then advanced about the bale and power lift which is thereafter disengaged from the bale and extended out again to pick up the next bale. The power lift is preferably arranged to pick up a bale simply by engagement with the lateral surfaces of the bale (i.e. its cylindrical surface in the case of a round bale), such a lifting arrangement enabling operation of the device in sheathing a row of juxtaposed bales where end surfaces are inaccessible.

As an alternative to bunching up the sheath around the outside of a tunnel structure, the device can be arranged to carry the axially closed up portion of the sheath 4 in a rolled-up inside-out condition as is illustrated in FIG. 6. In this latter Figure, reference 20 indicates an annular sheath-carrying structure of the device 1, the rolled-up sheath being held captive within the structure 20 and unrolling rearwardly as a bale passes through the middle of the structure 20. The structure 20 can be opened along a central radial plane for insertion of the rolled-up sheath. As with the embodiment of FIGS. 1 to 3, that of FIG. 6, is provided with skids 3 and bale-lifting means in the form of blades 10. The FIG. 6 embodiment is also provided with rear guide blades 21 to facilitate the deposition of bales from the device.

The described bale-sheathing device can be used to enclose bales of straw, hay or silage in plastic sheaths for treatment and/or storage.

I claim:

1. A bale-sheathing device for placing a tubular sheath around bales, said device comprising:
    a. tractor means,
    b. mobile sheath-carrying means having a direction of advance in use of the device and comprising an open-ended tubular structure axially aligned with said direction advance and having forward and rearward ends, said tubular structure being arranged to support and hold open an axially closed-up portion of said tubular sheath surrounding said tubular structure, enabling said closed-up portion to be opened out progressively by pulling said sheath portion rearwardly off the said rearward end of said tubular structure, c. a permanent attachment of the sheath carrying means to the tractor during placement of said bales within said tubular sheath;

d. bale lifting and guide means carried by the said mobile sheathing-carrying means and arranged to lift up a bale to be sheathed and guide it through said tubular structure as said sheath carrying means are advanced relative to the bale, whereby, in use of the device, said bale, after passage through said tubular structure emerges from the rearward end of said structure and comes to rest within an axially opened-out part of the sheath pulled from said tubular structure during advance of the device, said lifting and guide means comprising a guide structure which projects forwardly and downwardly from the sheath-carrying structure to engage beneath a bale as the bale-sheathing device is advanced, whereby stationary bales are sequentially and continuously lifted by the lifting and guide means as the device is advanced, e. the tractor means providing continuous forward movement of said sheath carrying means and of loading of said bales into said tubular sheath.

2. A bale-sheathing device according to claim 1, wherein said tubular structure of said sheath-carrying means is in the form of a short, large-diameter, tunnel structure arranged to carry the closed-up portion of the sheath corrugated around the outer surface of the tunnel structure, said bale lifting and guide means being arranged to guide each bale to be sheathed through the inside of the device, the bale passes through the said closed-up portion of the sheath without contact with the latter.

3. A bale-sheathing device according to claim 2, wherein idle rollers are provided within the said tunnel structure to facilitate the passage of a said bale therethrough.

4. A bale-sheathing device according to claim 2, wherein a powered conveyor is provided within the said tunnel structure to facilitate the passage of a said bale therethrough.

5. A bale-sheathing device according to claim 2, wherein the said tunnel structure is adjustable to alter its circumferential dimension whereby to adapt the tunnel structure to receive different sizes of sheath.

6. A bale-sheathing device according to claim 1, wherein the said sheath-carrying structure is arranged to carry the said closed-up portion of the sheath in a rolled up, inside-out, condition, the sheath being arranged to unwind rearwardly as a said bale is passed through the middle of the rolled-up portion of the sheath.

7. A bale-sheathing device according to claim 1 wherein each guide structure incorporates at least one powered roller for aiding the movement of a bale towards the sheath-carrying structure.

* * * * *